(12) United States Patent
Li et al.

(10) Patent No.: US 12,514,318 B2
(45) Date of Patent: Jan. 6, 2026

(54) GLUE-FREE ARTIFICIAL EYELASH PRODUCT PRODUCED BY ULTRASONIC WELDING AND MANUFACTURING METHOD THEREFORE

(71) Applicant: Qingdao Futesen Plastic Technology Co., Ltd, Qingdao (CN)

(72) Inventors: Kexiu Li, Qingdao (CN); Zhaozhong Zhang, Qingdao (CN)

(73) Assignee: Qingdao Futesen Plastic Technology Co., Ltd., Qingdao (CN)

( * ) Notice: Subject to any disclaimer, the term of this patent is extended or adjusted under 35 U.S.C. 154(b) by 0 days.

(21) Appl. No.: 19/215,247

(22) Filed: May 21, 2025

(65) Prior Publication Data

US 2025/0351908 A1    Nov. 20, 2025

Related U.S. Application Data

(63) Continuation-in-part of application No. 18/679,291, filed on May 30, 2024.

(30) Foreign Application Priority Data

May 14, 2024  (CN) .......................... 202410596438.4

(51) Int. Cl.
A41G 5/02    (2006.01)
(52) U.S. Cl.
CPC ...................... A41G 5/02 (2013.01)

(58) Field of Classification Search
CPC ........................................ A41G 5/02
See application file for complete search history.

(56) References Cited

U.S. PATENT DOCUMENTS

| | | | |
|---|---|---|---|
| 1,831,801 A * | 11/1931 | Birk .......................... | A41G 5/02 132/53 |
| 3,880,175 A | 4/1975 | Hosokawa | |
| 8,127,774 B2 * | 3/2012 | Dinh ........................ | A41G 5/02 132/216 |
| D790,771 S | 6/2017 | Stoka | |
| 10,660,388 B2 | 5/2020 | Lotti | |
| 2018/0360148 A1 * | 12/2018 | Dinh ....................... | A45D 44/00 |
| 2020/0329798 A1 * | 10/2020 | Li ............................ | A41G 5/02 |
| 2021/0161233 A1 | 6/2021 | Lotti | |

* cited by examiner

Primary Examiner — Rachel R Steitz
(74) Attorney, Agent, or Firm — Arch & Lake LLP (57) ABSTRACT

A glue-free artificial eyelash product produced by ultrasonic welding and a manufacturing method are provided. The method including: obtaining an auxiliary film; shaping a tip part of an eyelash cluster by a vacuum negative-pressure shaping method to obtain an eyelash cluster with a curved tip part, where the curved tip part comprises a plurality of eyelashes, where a single root on an end part of the eyelash cluster spread out into the plurality of eyelashes; affixing a plurality of the eyelash clusters onto an adhesive substrate to form an eyelash cluster sheet; welding eyelash cluster sheet on the auxiliary film by ultrasonic welding to form semi-finished product; and cutting off eyelash waste material from the semi-finished product to obtain the artificial eyelash product.

8 Claims, 7 Drawing Sheets

GLUE-FREE ARTIFICIAL EYELASH PRODUCT PRODUCED BY ULTRASONIC WELDING AND MANUFACTURING METHOD THEREFORE

CROSS REFERENCE TO RELATED DISCLOSURES

This application is a continuation-in-part of U.S. application Ser. No. 18/679,291, filed on May 30, 2024, which claims foreign priority of Chinese Patent disclosure No. 202410596438.4, filed on May 14, 2024 in the China National Intellectual Property Administration, the disclosures of all of which are hereby incorporated by references.

TECHNICAL FIELD

The present disclosure relates to the technical field of cosmetic and makeup products, and more particularly to a glue-free artificial eyelash product that is suitable for both grafted and self-wear applications. The product is manufactured using an ultrasonic welding process, and the disclosure further provides a corresponding method of manufacture.

BACKGROUND

In recent years, because of the convenient and beautiful characteristics, the artificial eyelash products are become more and more popular among women, and become an essential makeup product when women make up. But the existing artificial eyelashes are mostly made by two methods, one is to use thread and glue to bond the eyelashes, but glue is harmful to human body and long-term use will have certain impact on health; the other method is made of hot melting technology, and the artificial eyelashes products have the disadvantage of fragile and easily broken, which brings the inconvenience of use, and reduces the comfort of wearing.

Furthermore, current artificial eyelash products are generally categorized into two types: grafted eyelashes and self-wear eyelashes. Grafted eyelashes, also known as "cluster lashes," are composed of individual clusters applied one by one. This approach is favored by professional lash technicians due to its precision and adaptability to various eye shapes. However, it requires skill, time, and specialized tools, limiting its practicality for everyday users. In contrast, self-wear eyelashes are typically manufactured as a one-piece strip or sheet, allowing users to apply them easily without professional assistance. While more convenient and time-saving, self-wear types often lack the styling flexibility and natural appearance of cluster lashes. Their fixed shape also reduces adaptability to different eye contours and personal preferences.

Despite growing consumer demand for products that are both user-friendly and customizable, there is an ongoing challenge in the field of artificial eyelash products to develop a solution that effectively integrates the advantages of both grafted (cluster-type) and self-wear (strip-type) eyelashes.

SUMMARY

The present disclosure provides a glue-free artificial eyelash product and a corresponding manufacturing method using ultrasonic welding. The eyelash product is designed to be soft, comfortable, and easy to use, and is suitable for both grafting by professionals and self-wear by consumers. This enables greater versatility in application while eliminating the need for harmful adhesives.

In a first aspect, the present disclosure provides a method for manufacturing an artificial eyelash product. First, an auxiliary film is obtained. Then, a tip part of an eyelash cluster is shaped using a vacuum negative-pressure shaping method. This process creates an eyelash cluster with a curved tip. The curved tip includes a plurality of individual eyelashes. These eyelashes extend from a single integrally formed root located at one end of the cluster. Next, multiple eyelash clusters are affixed to an adhesive substrate. This forms an eyelash cluster sheet. The eyelash cluster sheet is then welded onto the auxiliary film using ultrasonic welding. This results in a semi-finished product. Finally, excess eyelash material is cut away from the semi-finished product. The remaining structure forms the finished artificial eyelash product.

In a second aspect, the present disclosure provides an artificial eyelash product. The product includes an auxiliary film and an eyelash cluster sheet affixed to the film. The eyelash cluster sheet contains multiple eyelash clusters. Each eyelash cluster includes a curved tip part and an end part. The curved tip part is made up of several individual eyelashes. The end part is fixed to the auxiliary film. It includes a single, integrally formed root. From this root, the individual eyelashes extend either radially or in a specific direction.

The present disclosure provides a glue-free artificial eyelash product and its manufacturing method, utilizing ultrasonic welding to bond eyelash clusters to an auxiliary film. By replacing traditional glue and thread-based bonding techniques with ultrasonic welding and an auxiliary film, the resulting eyelash product demonstrates enhanced toughness, improved softness, and greater flexibility. These features contribute to a final product that is not only more durable and less prone to breakage but also significantly more comfortable to wear. The glue-free design eliminates potential health concerns associated with prolonged exposure to adhesives, offering a safer alternative for both professional and personal use.

Furthermore, the artificial eyelash product produced according to the present disclosure is highly versatile. It is designed to be suitable for both grafted application by professionals—thanks to its clustered structure and precision-formed tips—as well as self-wear by everyday consumers, owing to its integrated strip-like form and ease of handling. This dual functionality bridges the gap between existing product categories, offering a single solution that combines the customizability of grafted lashes with the convenience of self-wear strips.

Additionally, the auxiliary film used in place of thread further enhances the functionality and aesthetics of the product. Unlike thread, the auxiliary film has a flatter cross-section, resulting in a flatter and more discrete eyelash stalk after cutting. This slim profile reduces bulk on the inner side of the eyelid, significantly improving wearing comfort. Furthermore, the auxiliary film's lower elasticity compared to thread allows for more stable lash placement during manufacturing, reducing precision requirements and increasing the consistency of mass production. As a result, the production process becomes more efficient and less prone to error.

In summary, the present disclosure offers a comprehensive improvement over conventional artificial eyelash products. By addressing the limitations of both glue-based and thread-based methods, and by providing a design suitable for both grafting and self-wear, the disclosed product delivers enhanced comfort, convenience, aesthetic appeal, and manufacturing efficiency.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely used to explain relative position relationships or motion conditions between the components in a specific attitude (as shown in the drawings). The directional indication changes as the specific attitude changes.

It should be noted that when an element is described as "being fixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. In addition, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

Figure 1:
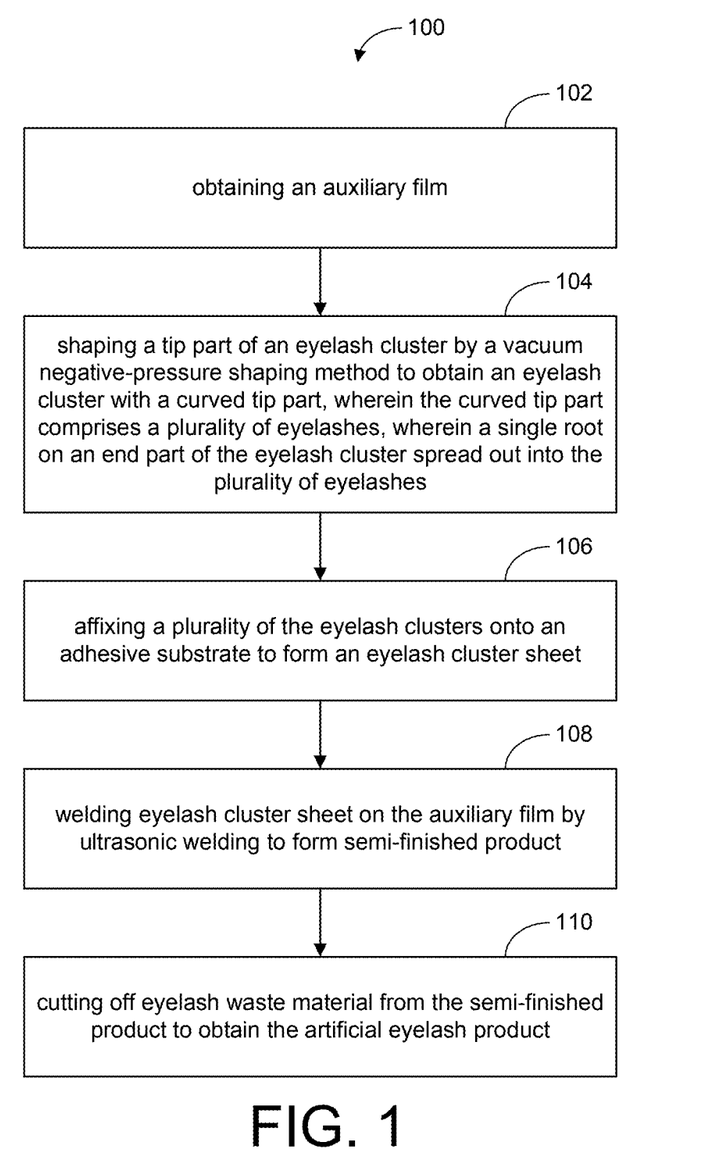
FIG. 1 is a flowchart illustrating the manufacturing method of an artificial eyelash product using ultrasonic welding, according to an embodiment of the present disclosure.

FIG. 1 is a flowchart illustrating a method for manufacturing a glue-free artificial eyelash product using ultrasonic welding, according to an embodiment of the present disclosure. The method includes a sequence of steps designed to produce an eyelash product suitable for both grafted and self-wear applications, while eliminating the use of glue and improving comfort, aesthetics, and production efficiency.

At step 102, the method begins with obtaining an auxiliary film. The auxiliary film, which serves as a supporting layer or structure in the manufacturing process, can be formed through a variety of advanced techniques. One method includes laser cutting, where high-powered lasers are used to precisely cut the material into desired shapes. Another method is 3D printing, which allows for the creation of complex and intricate structures by layering material based on a digital design. Drawing molding is another method to obtain the auxiliary film, where the film is stretched and shaped through a molding tool to achieve a specific thickness and form. Extrusion is another method to obtain the auxiliary film, where melted material is forced through a die to create continuous shapes or films. Lastly, the auxiliary file can also be obtained via blowing process, which involves inflating a heated plastic tube to form a thin, uniform film. In some examples, the auxiliary film is composed of polyester, a durable and versatile material known for its flexibility and clarity.

In some examples, the shape of the auxiliary can include strips, blocks, flakes, or clusters, each serving different functional or aesthetic purposes in the overall design of the artificial eyelashes. The auxiliary film replaces traditional thread to improve both the functionality and visual appeal of the artificial eyelash product. The auxiliary film features a flatter cross-sectional profile compared to conventional thread, which contributes to the formation of a thinner and more discreet eyelash stalk after cutting. This streamlined structure minimizes bulk on the inner side of the eyelid, thereby enhancing comfort during wear. Additionally, the auxiliary film exhibits lower elasticity than thread, which aids in maintaining more stable lash positioning throughout the manufacturing process. This reduced elasticity lessens the need for high-precision alignment, allowing for greater consistency and reliability during mass production. As a result, the overall manufacturing process is more efficient, with fewer errors and improved product uniformity. In some examples, the auxiliary film may be translucent or transparent, which serves to enhance the invisibility of the artificial eyelash product when wearing, ensuring a natural and seamless appearance.

At step 104, the method includes shaping a tip part of an eyelash cluster by a vacuum negative-pressure shaping method to obtain an eyelash cluster with a curved tip part, where the curved tip part a plurality of eyelashes, where an integrally formed single root on an end part of the eyelash cluster spread out into the plurality of eyelashes. In this process, the eyelash cluster is first formed by laser cutting, where a high-precision laser beam is used to cut synthetic fiber material into a predefined pattern, resulting in an eyelash cluster with an integrally formed single root at one end and a plurality of eyelashes extending outward. Once the eyelash cluster is formed, the tip part is shaped using a vacuum negative-pressure shaping method. In some examples, shaping the tip part of the eyelash cluster includes placing the eyelash cluster into a female die and applying suction through an air extraction port at the bottom. A male die is then pressed onto the female die to form a complete mold. The suction causes the eyelashes to conform to the curved shape of the die surface, resulting in a curved tip part. In some examples, the plurality of eyelashes extending from an integrally formed single root at the end part of the eyelash cluster consists of at least three distinct eyelashes, each varying in length. The first eyelash has a length defined as the first length, the second eyelash has a different second length, and the third eyelash is characterized by a third length, all contributing to a more natural and voluminous appearance. These eyelashes can range in length from as short as 1 mm to as long as 30 mm, providing versatility in customization based on specific design preferences. The varying lengths of the eyelashes create a textured look that enhances the overall aesthetic effect, mimicking the natural growth pattern of real lashes.

At step 106, the method includes affixing a plurality of the eyelash clusters to an adhesive substrate to form an eyelash cluster sheet. In some examples, the adhesive substrate may include tape, film, sheet, strip, or other materials that with adhesive properties. In some examples, the root parts of the eyelash clusters are affixed to one side of the tape, while excess or waste material remains on the opposite side. The spacing between clusters may range from 0.1 mm to 10 mm, allowing for customized density and styling.

At step 108, the method includes welding eyelash cluster sheet on the auxiliary film by ultrasonic welding to form semi-finished product. In some examples, welding eyelash cluster sheet on the auxiliary film includes pressing a welding head down onto the eyelash roots and applying ultrasonic vibrations and pressure. The ultrasonic energy fuses the materials at the bonding points, securely attaching the cluster sheet to the film without the need for adhesive. This results in a semi-finished product with improved structural integrity and comfort.

At step 110, the method includes cutting off the eyelash waste material from the semi-finished product to obtain the artificial eyelash product. By trimming away the excess material, the process yields the final artificial eyelash product, which features a clean, soft base and naturally shaped lashes. The absence of glue enhances both safety and comfort for the user, while the flattened cross-section of the auxiliary film reduces the footprint on the eyelid, making the product suitable for both self-application and professional grafting.

As described above, this method not only improves wearability and aesthetics but also simplifies manufacturing steps, reduces production time, and increases overall efficiency.

Figure 2A:
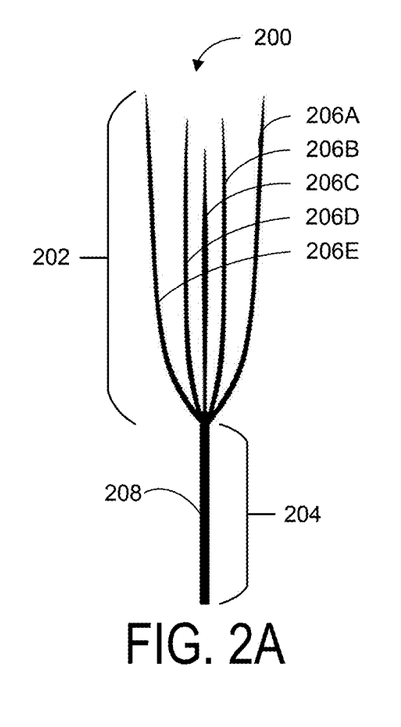
FIG. 2A is a top view schematic diagram showing the structure of an eyelash cluster, according to an example of the present disclosure.

FIG. 2A is a top view schematic diagram showing the structure of an eyelash cluster, according to an example of the present disclosure. As shown in FIG. 2A, an eyelash cluster 200 includes a tip part 202 and an end part 204, where the tip part includes a plurality of individual eyelashes 206A-206E that extend outwardly from an integrally formed single root 208 located at the end part 204 of the cluster.

Figure 2B:
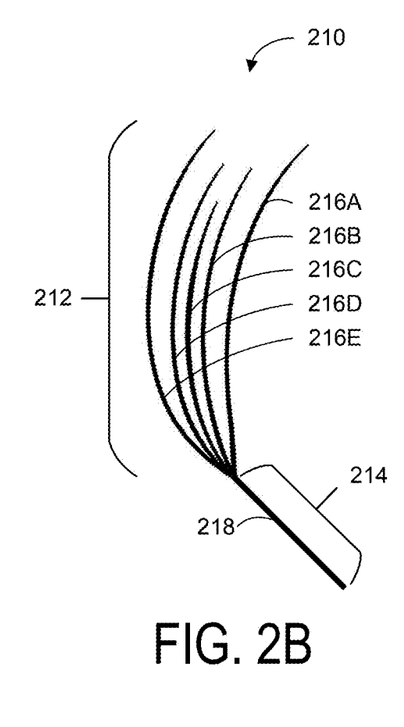
FIG. 2B is a side view schematic diagram showing the structure of an eyelash cluster, according to an example of the present disclosure.

The eyelashes 206 located in the tip part 202 are arranged in a fan-shaped pattern, radiating outward from the integrally formed single root 208. This configuration closely mimics the natural growth pattern of real human lashes, thereby enhancing the realistic appearance of the artificial eyelash cluster. In some examples, the eyelash cluster may include at least a first eyelash, a second eyelash, and a third eyelash, each differing in length to create a layered and voluminous effect. As illustrated in FIG. 2B, the eyelash cluster 210 includes five individual eyelashes. Specifically, eyelashes 206A and 206E have a length of 12 mm, eyelashes 206B and 206D have a length of 12 mm, and the central eyelash 206C has a length of 5 mm. This staggered arrangement contributes to a tapered, natural look. In some examples, the lengths of the eyelashes can range from 1 mm to 30 mm, offering flexibility in design and customization. Additionally, the number of eyelashes in a cluster may vary based on the desired density and aesthetic effect.

The root 208 on the end part 204 of the eyelash cluster 200 is configured to be bonded to an auxiliary film using ultrasonic welding in a later manufacturing step.

FIG. 2B is a side view schematic diagram showing the structure of an eyelash cluster, according to an example of the present disclosure. As shown in FIG. 2B, an eyelash cluster 210 includes a tip part 212 and an end part 214, where the tip part includes a plurality of individual eyelashes 216A-216E that extend outwardly from an integrally formed single root 218 located at the end part 214 of the cluster.

From the side perspective, the eyelashes 216A-216E in the tip part 212 are shown to follow a predefined curvature, which is achieved using a vacuum negative-pressure shaping method during the manufacturing process. The eyelash cluster is first formed by laser cutting, where a high-precision laser beam is used to cut synthetic fiber material into a predefined pattern, resulting in an eyelash cluster with an integrally formed single root at one end and a plurality of eyelashes extending outward. Once the eyelash cluster is formed, the eyelash cluster is first placed into a specially designed female die, which features an air extraction port located at its bottom. A male die is then pressed down onto the female die to enclose the eyelash cluster within a complete mold structure.

To shape the eyelashes 216A-216E, an air pump is connected to the air extraction port of the female die. When activated, the air pump draws air from the interior of the mold, generating negative pressure that causes the individual eyelashes to be tightly pressed against the surface of the die. This vacuum shaping ensures that the eyelashes 216A-216E conform precisely to the contours of the mold, resulting in a uniformly curved tip part.

The shaping effect created by the complementary forms of the male and female dies helps establish a consistent upward curl or fan-like lift in the eyelashes, which enhances both aesthetic appeal and compatibility with natural lash lines. Additionally, this process contributes to the stable arrangement and positioning of the eyelashes, supporting downstream bonding and assembly steps such as alignment on adhesive substrate and welding onto the auxiliary film. In some examples, the adhesive substrate may include tape, film, sheet, strip, or other materials that with adhesive properties.

The end part 214, which contains the single root 218, remains straight and is designed to interface with the auxiliary film during ultrasonic welding. This structure enables reliable anchoring of the eyelash cluster to the film while preserving the aesthetic integrity of the curved tip part.

The combination of the fan-shaped arrangement, variable lengths, and single root structure ensures that each eyelash cluster exhibits a full, voluminous, and naturally tapering appearance, contributing to the overall functionality and visual appeal of the artificial eyelash product.

Figure 3:
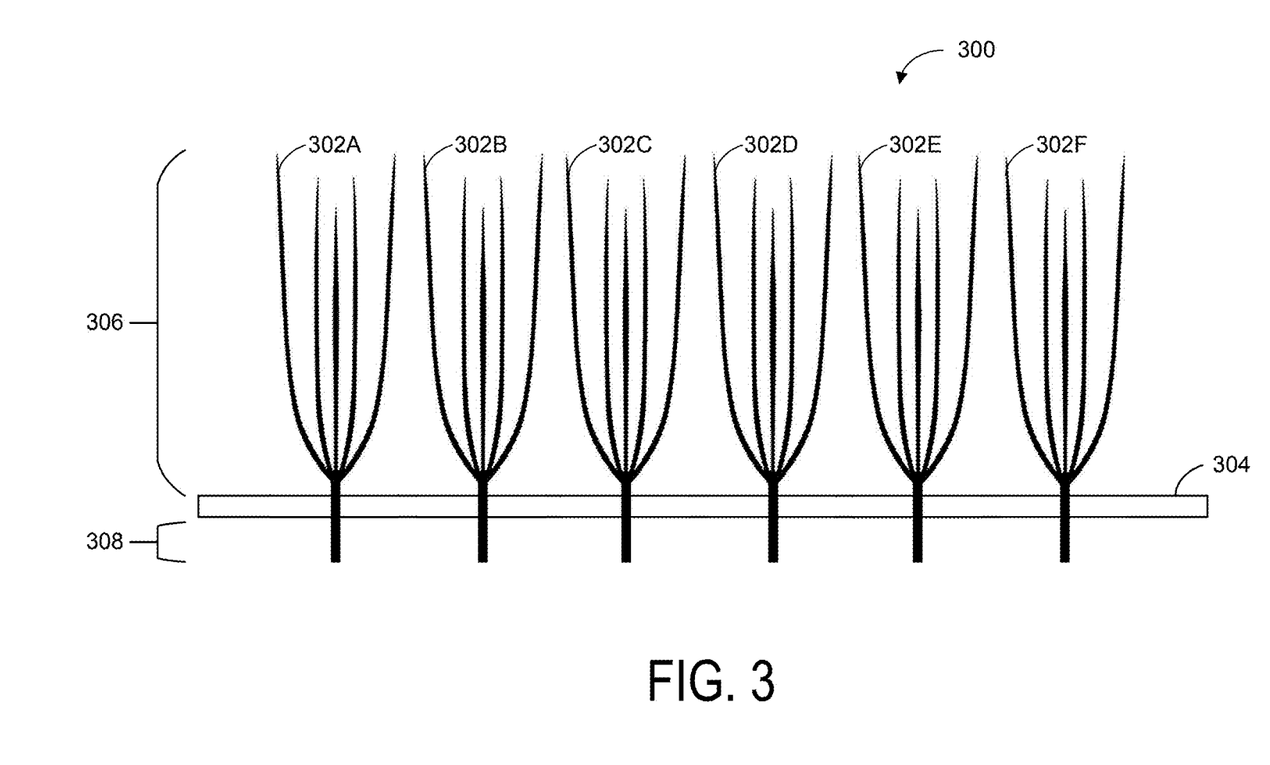
FIG. 3 is a schematic diagram illustrating an eyelash cluster sheet, according to an example of the present disclosure.

FIG. 3 is a schematic diagram illustrating an eyelash cluster sheet, according to an example of the present disclosure. The eyelash cluster sheet 300 includes a structured assembly of multiple eyelash clusters 302A-302F and an adhesive substrate 304.

Each eyelash cluster 302A-302F consists of a group of eyelashes joined at a single root portion. The eyelashes may be pre-shaped using a vacuum negative-pressure die forming process to produce a curved tip, giving the lashes a natural, fanned appearance. In some examples, the clusters 302A-302F are evenly spaced along the length of an adhesive substrate 304, which temporarily secures them during the welding process. The spacing between clusters can vary based on the desired lash style and may range from 0.1 mm to 10 mm. In other examples, the clusters may be irregularly spaced along the adhesive substrate 304 to achieve a different aesthetic.

The adhesive substrate 304 functions as a support structure during assembly and features two functional sides: a first side 306 holds the curved tip portions of the eyelash clusters 302A-302F, while a second side 308 may contain excess eyelash material, which is trimmed off during the finishing stage.

Figure 4:
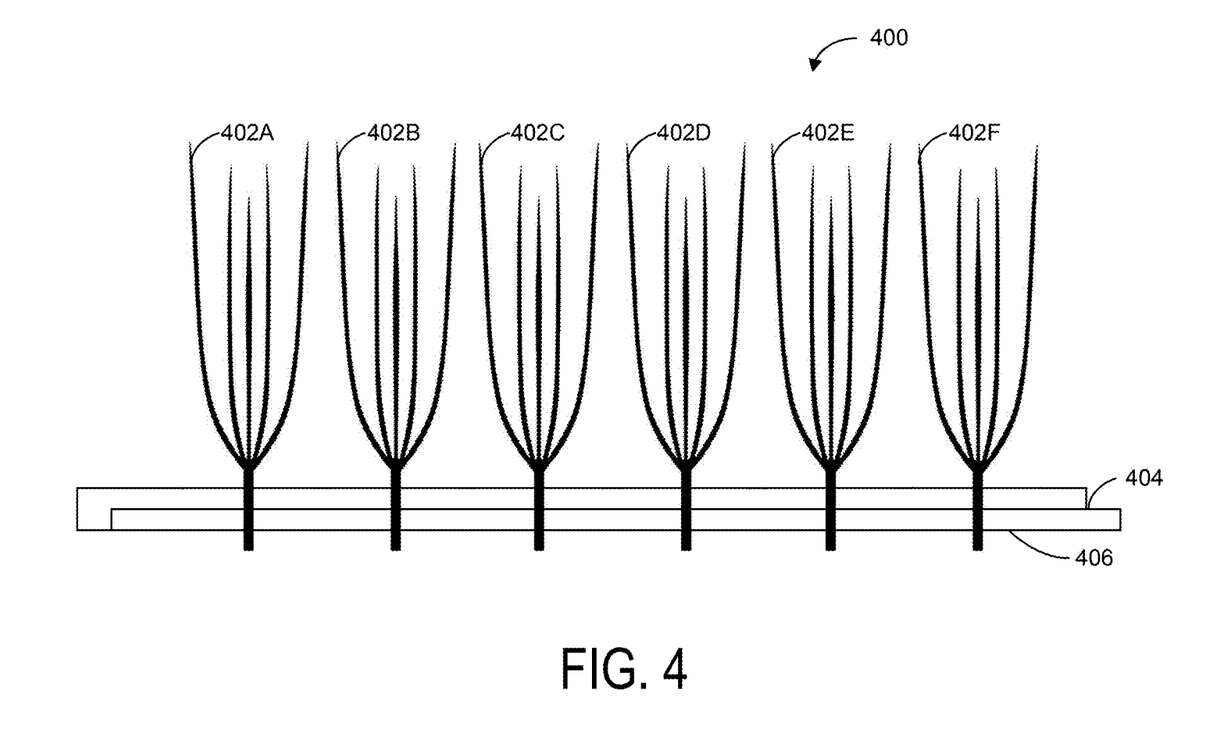
FIG. 4 is a schematic diagram illustrating a semi-finished product, according to an example of the present disclosure.

FIG. 4 is a schematic diagram illustrating a semi-finished product, according to an example of the present disclosure. As shown, the semi-finished product 400 includes a plurality of eyelash clusters 402A-402F, an adhesive substrate 404, and an auxiliary film 406. The eyelash clusters 402A-402F are arranged in a predetermined pattern along the adhesive substrate 404.

In this example, an eyelash cluster sheet, which includes eyelash clusters 402A-402F and adhesive substrate 404, is positioned over the auxiliary film 406. An ultrasonic welding process is then applied to bond the root portions of the eyelash clusters to the auxiliary film. This welding process involves pressing a welding head of an ultrasonic welding machine downward until it makes contact with the end portions of the eyelash clusters. Upon contact, ultrasonic energy is delivered while simultaneously applying a controlled pressure, generating localized heat through high-frequency mechanical vibrations. This fuses the root ends of the eyelash clusters to the auxiliary film 406 without the need for additional adhesives, ensuring a secure and clean bond.

The auxiliary film 406 may be fabricated by a variety of methods depending on the desired material properties and shape. In some examples, the auxiliary film 406 is formed by laser cutting, where an auxiliary film raw material is placed on a positioning table and cut using a high-energy laser beam generated by a laser cutting machine. The cutting follows a preset cutting path stored in a laser forming machine to obtain a pre-defined shape of the auxiliary film 406. In some examples, the auxiliary film 406 is created through a 3D printing film-forming process. A digital three-dimensional model of the desired film is first created and sliced into multiple thin layers corresponding to the standard thickness of the film. A high-temperature-resistant release film is preset on the working table of a 3D printer. The printer then deposits material layer-by-layer to build the auxiliary film according to the model. In some examples, the auxiliary film 406 may also be produced using traditional film-forming techniques such as drawing molding, extrusion, or film blowing.

The auxiliary film 406 may take on various shapes, including strips, blocks, flakes, or clusters, depending on the design requirements of the eyelash product. The auxiliary film 406 may have a thickness ranging from 0.001 mm to 1 mm, and a width ranging from 0.1 mm to 100 mm, depending on the application requirements. In some examples, the auxiliary film is made from polyester material due to its durability, flexibility, and heat resistance during ultrasonic welding. In some examples, the auxiliary film may be translucent or transparent, which helps to reduce visual visibility when applied, thereby enhancing the natural appearance of the lash line.

Figure 5:
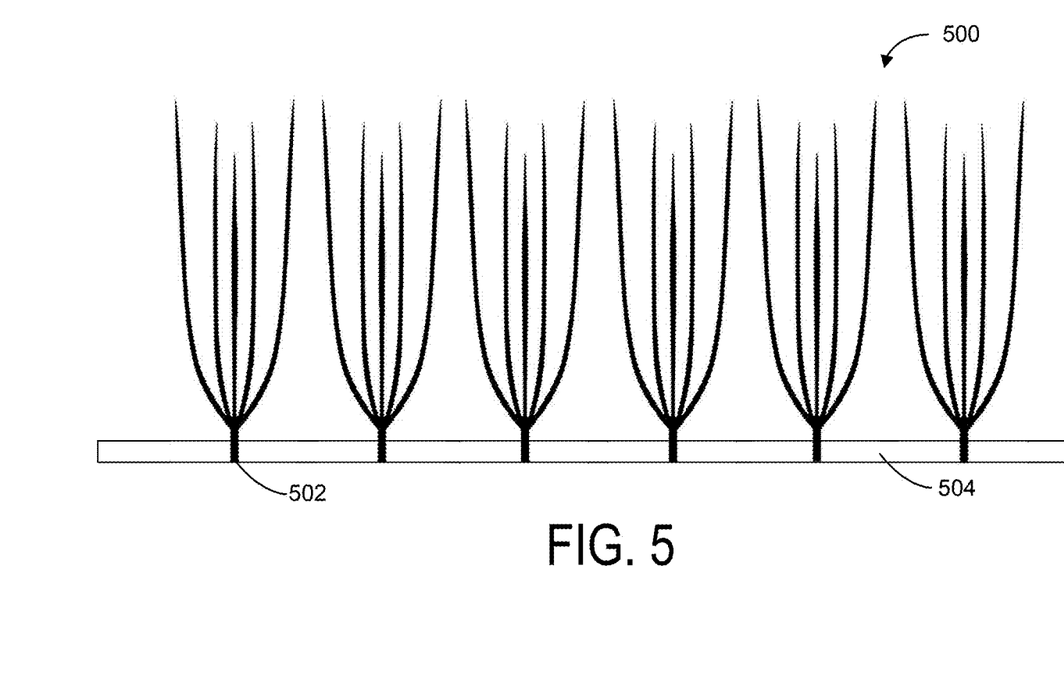
FIG. 5 is a schematic structural diagram of a glue-free artificial eyelash product, according to an example of the present disclosure.

FIG. 5 is a schematic structural diagram of a glue-free artificial eyelash product, according to an example of the present disclosure. As depicted, the artificial eyelash product 500 includes a plurality of root portions 502 bonded to an auxiliary film 504. This configuration is achieved through ultrasonic welding, as described above, which securely affixes the root portions of the eyelash clusters to the auxiliary film 504 without the use of chemical adhesives.

After ultrasonic welding is complete, excess material, including any residual adhesive substrate or misaligned lash fibers, is trimmed to yield the final glue-free artificial eyelash product. The absence of residual adhesive material or sharp film edges significantly enhances both the aesthetic appeal and the wearing comfort of the product. Additionally, the soft and clean base improves compatibility with various application methods.

The glue-free design made possible by ultrasonic welding and precision trimming offers several substantial advantages over traditional eyelash products that rely on glue-based bonding. These benefits include the elimination of visible glue lines, reduction of potential skin irritation or allergic reactions, and an overall increase in product durability and longevity. The use of ultrasonic bonding also reduces the risk of lash shedding or root detachment over time.

The finished artificial eyelash product 500 is lightweight and flexible, making it highly suitable for both professional eyelashes grafting applications and self-wear by individual consumers. Its refined construction ensures that it adheres comfortably to the skin or natural lash line, maintaining a natural look and feel throughout extended use. Furthermore, the product's structural integrity allows for multiple wears without deformation or loss of lash orientation.

Figure 6:
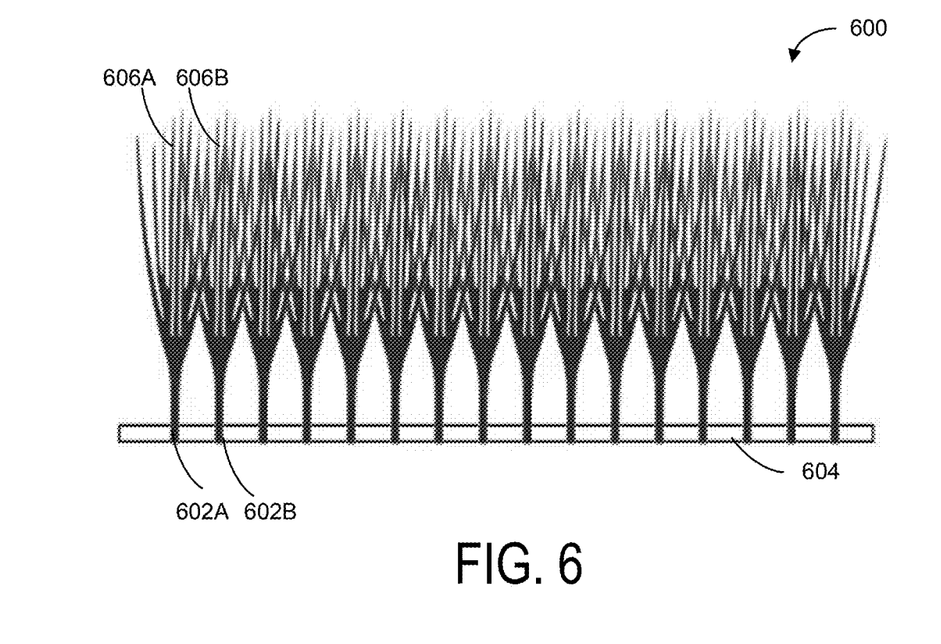
FIG. 6 is a schematic structural diagram of a glue-free artificial eyelash product, according to an example of the present disclosure.

FIG. 6 is a schematic structural diagram illustrating an example configuration of a glue-free artificial eyelash product 600 composed of two eyelash cluster sheets arranged in a layered and interlaced fashion, according to an embodiment of the present disclosure. This figure highlights a unique assembly strategy where multiple eyelash cluster sheets are combined to enhance the volume, texture, and dimensionality of the final eyelash product while preserving the advantages of glue-free ultrasonic welding.

In the illustrated example, two eyelash cluster sheets are used to construct the artificial eyelash product 600. The root portions of the cluster sheets are labeled as 602A and 602B, and the tip portions as 606A and 606B. In this example, the root portions 602A and 602B are placed adjacent to each other without overlapping, which helps to maintain a flat and low-profile base. This configuration minimizes bulk at the lash line, enhancing wearer comfort and simplifying application, particularly for self-wear or professional grafting. In another example (not shown in FIG. 6), the root portions of two or more eyelash cluster sheets may be intentionally overlapped to create a thicker and denser base appearance, which can enhance the perceived volume and intensity of the lash line for more dramatic styling preferences.

The tip portions of the eyelash cluster sheets, 606A and 606B, extend outwardly and are arranged in a crossed or interwoven pattern. In some examples, the two eyelash cluster sheets may be evenly crossed over, with the tips symmetrically layered to produce a balanced and uniform appearance. In other examples, the sheets may be unevenly crossed over, where the tips are offset or asymmetrically interlaced to create a more textured, wispy, or irregular effect. This overlapping of the lash tips creates a layered, three-dimensional appearance, giving the lashes enhanced volume and visual depth. The crossed tip arrangement contributes to a more natural look by mimicking the organic variation and complexity of real human eyelashes. Depending on the design intent, the crossing pattern may vary in angle, spacing, density, or direction, enabling the creation of diverse aesthetic styles such as soft and natural, bold and dramatic, or winged cat-eye effects.

The assembly process begins by affixing each eyelash cluster sheet to a second adhesive substrate to ensure stable positioning during welding. The root portions 602A and 602B are then precisely aligned and ultrasonically welded onto an auxiliary film 604. This film acts as a flexible base layer that replaces traditional eyelash band materials, such as thread. The ultrasonic welding process securely bonds the roots to the film without the use of glue or chemical adhesives, thereby improving skin safety and long-term durability.

After the welding step, excess material, including adhesive substrate and misaligned lash fibers, is trimmed away to form the clean edges and contours of the final product. The resulting glue-free artificial eyelash product 600 features a smooth and lightweight base formed by the auxiliary film 604, with lashes arranged in a visually rich and voluminous formation due to the crossover of tip portions.

Although FIG. 6 illustrates only two eyelash cluster sheets, this configuration is merely exemplary. In other examples, multiple eyelash cluster sheets may be combined to form the artificial eyelash product. Each cluster sheet may feature a distinct eyelash pattern, where the term eyelash pattern refers to the specific arrangement and characteristics of individual eyelashes within a cluster sheet, including parameters such as eyelash length, curl curvature, spacing, thickness, and orientation. In some examples, a first eyelash cluster sheet having a first eyelash pattern may be paired with a second eyelash cluster sheet having a second, different eyelash pattern to achieve a customized design. For instance, shorter inner lashes on one sheet may be combined with longer outer lashes on another sheet to produce a graduated winged effect. In another example, eyelash cluster sheets with alternating curl types or varying densities may be layered to enhance depth, volume, and dimensional texture, resulting in a more natural or dramatic look depending on the desired aesthetic.

This innovative method of combining multiple eyelash cluster sheets on a glue-free base enables manufacturers to create richly styled lashes while maintaining comfort, flexibility, and production efficiency. The modular design also simplifies the integration of varied lash styles, enabling mass customization with minimal changes to the core assembly process.

Figure 7:
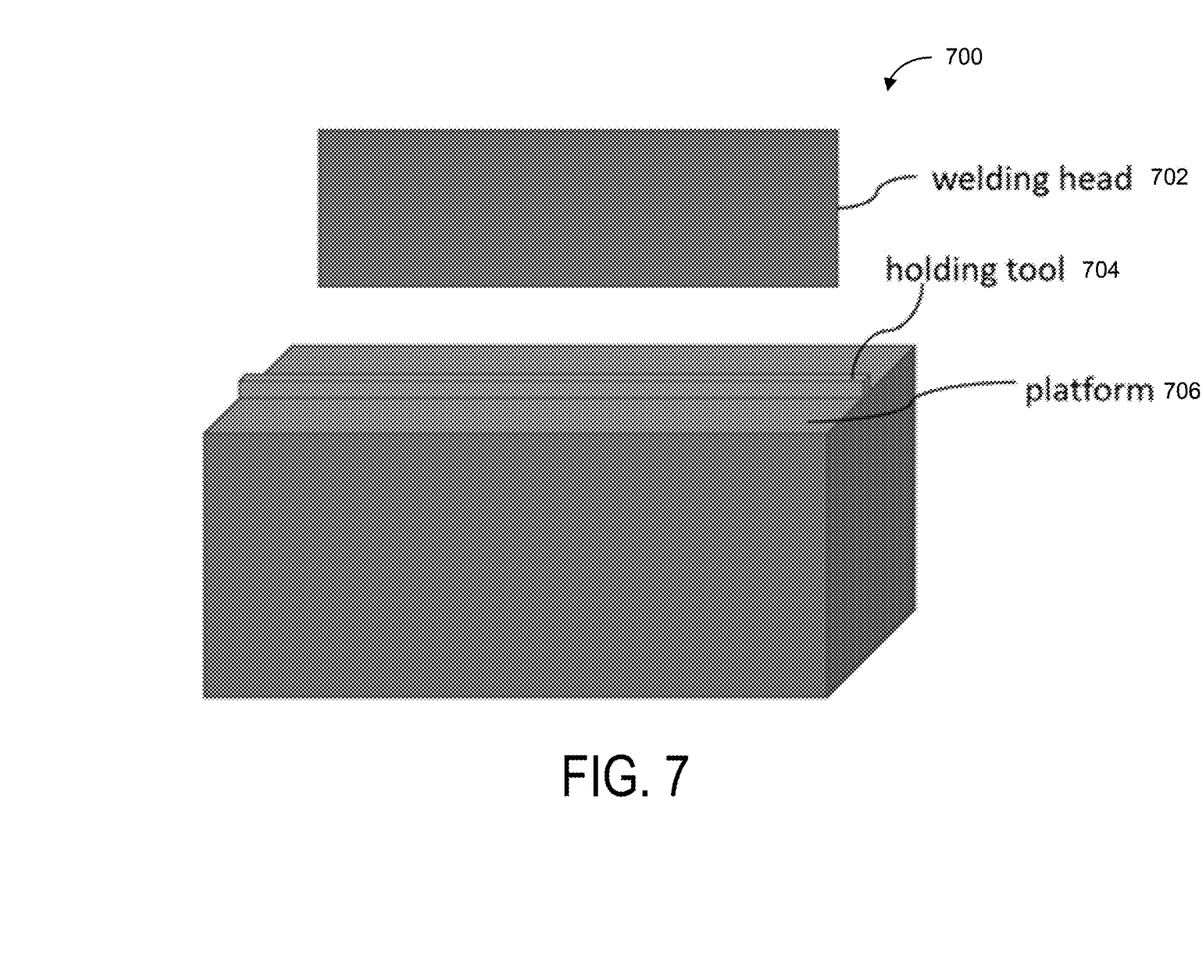
FIG. 7 is a schematic structural diagram of an ultrasonic welding machine, according to an example of the present disclosure.

FIG. 7 is a schematic structural diagram of an ultrasonic welding machine according to an example of the present disclosure. The ultrasonic welding machine 700 includes a welding head 702, a holding tool 704, and a platform 706. The welding head 702 is the primary active component, responsible for generating ultrasonic vibrations. During operation, it is driven downward until it contacts the end portions of the eyelash clusters, which have been pre-aligned into an eyelash cluster sheet using adhesive substrate. This eyelash cluster sheet is then positioned on an auxiliary film for welding. The welding head 702 delivers ultrasonic energy while simultaneously applying controlled downward pressure. This combination of pressure and high-frequency vibrations generates localized heat at the interface between the eyelash roots and the auxiliary film, causing the materials to fuse and form a unified product.

The holding tool 704 is designed to securely position and stabilize the eyelash cluster sheet and the auxiliary film during the welding process. It may include customized slots, channels, or molds corresponding to the dimensions of the eyelash cluster sheet and auxiliary film to ensure consistent placement and alignment.

The platform 706 serves as the base surface. It provides structural support and may incorporate adjustable features such as height control, vibration dampening, or thermal resistance depending on production requirements. In some examples, the platform 606 may be integrated with a vacuum suction mechanism to assist in fixing lightweight materials such as the eyelash cluster sheet and/or the auxiliary film in place during welding.

In operation, a user first positions the auxiliary film and the eyelash clusters in the holding tool 704, which rests on the platform 706. The ultrasonic welding head 702 is then brought down into contact with the root areas of the eyelash clusters. Upon activation, ultrasonic vibrations are transmitted through the welding head, generating localized heat and bonding the materials. After the welding cycle is complete, the assembly is released, and the semi-finished eyelash product can proceed to the trimming and finishing stages.

In one example, the present disclosure provides a method for manufacturing an artificial eyelash product, including: obtaining an auxiliary film; shaping a tip part of an eyelash cluster by a vacuum negative-pressure shaping method to obtain an eyelash cluster with a curved tip part, where the curved tip part includes a plurality of eyelashes, where an integrally formed single root on an end part of the eyelash cluster spread out into the plurality of eyelashes; affixing a plurality of the eyelash clusters onto an adhesive substrate to form an eyelash cluster sheet; welding eyelash cluster sheet on the auxiliary film by ultrasonic welding to form semi-finished product; and cutting off eyelash waste material from the semi-finished product to obtain the artificial eyelash product.

In some examples, obtaining the auxiliary film includes: placing an auxiliary film raw material to be cut on a positioning table for fixing; utilizing a high-energy laser beam generated by a laser cutting machine in a laser forming machine, and cutting the auxiliary film raw material according to a preset cutting path; cutting the auxiliary film according to the preset cutting path by the laser cutting machine to obtain an auxiliary film in a required shape; and carrying out quality inspection on the obtained auxiliary film.

In some examples, the auxiliary film is obtained via a 3D printing film forming process, where obtaining the auxiliary film includes: creating and importing a three-dimensional model of a required auxiliary film by computer software; cutting the three-dimensional model of the auxiliary film into a thin layer with a standard thickness of the auxiliary film; and presetting a high-temperature resistant release film on a working table of a 3D printer, and then starting up the 3D printer to print layer by layer according to a number of thin layers to obtain the required auxiliary film.

In some examples, a shape of the auxiliary film includes a strip, a block, a flake, or a cluster.

In some examples, shaping the tip part of the eyelash cluster by the vacuum negative-pressure shaping method includes: placing the eyelash cluster into a female die, where a bottom portion of the female die is provided with an air extraction port, and pressing a male die above the female die to form a complete die; communicating an air extraction end of an air pump with the air extraction port at the bottom portion of the female die and extracting air in an interior of the assembled die to enable the eyelash cluster to be attached to a surface of the die; and shaping the tip part of the eyelash cluster by utilizing shapes of the female die and the male die.

In some examples, affixing the plurality of the eyelash clusters to the adhesive substrate onto form the eyelash cluster sheet includes: adhering a plurality of root parts of the eyelash clusters to the adhesive substrate to form the eyelash cluster sheet, where a first side of the adhesive substrate includes the plurality of eyelashes, where a second side of the adhesive substrate includes the eyelash waste material.

In some examples, welding eyelash cluster sheet on the auxiliary film by ultrasonic welding to form semi-finished product includes: pressing down a welding head of an ultrasonic welding machine until the ultrasonic welding machine contacts with the plurality of the end parts of the eyelash clusters; and applying welding pressure and ultrasonic vibration to bond the eyelash cluster sheet to the auxiliary film.

In some examples, the auxiliary film is made by a drawing molding process, an extrusion process, or a film blowing process.

In some examples, the auxiliary film is made of polyester material.

In some examples, the plurality of eyelashes radially or directionally spread out from the single root on the end part of the eyelash cluster includes a at least a first eyelash having a first length, a second eyelash having a second length, and a third eyelash having a third length.

In some examples, the auxiliary film is translucent or transparent.

In some examples, the plurality of eyelashes in the curved tip part are arranged in a fan-shaped pattern radiating from the single root.

In some examples, the plurality of the eyelash clusters is spaced apart from one another at intervals ranging from 0.1 mm to 10 mm along the adhesive substrate.

In another example, the present disclosure provides an artificial eyelash product including: an auxiliary film; and an eyelash cluster sheet affixed to the auxiliary film, where the eyelash cluster sheet includes a plurality of eyelash clusters, where an eyelash cluster of the plurality of eyelash clusters includes: a curved tip part includes a plurality of eyelashes; and an end part fixed to the auxiliary film, where the end part includes an integrally formed single root from which the plurality of eyelashes radially or directionally extend.

In some examples, a shape of the auxiliary film includes a strip, a block, a flake, or a cluster.

In some examples, the auxiliary film is made of polyester material, human hair, Mink fur, silk, horse hair, feathers, or Cellulose.

In some examples, the plurality of eyelashes radially or directionally spread out from the integrally formed single root on the end part of the eyelash cluster includes a at least a first eyelash having a first length, a second eyelash having a second length, and a third eyelash having a third length.

In some examples, the auxiliary film is translucent or transparent.

In some examples, the plurality of eyelashes in the curved tip part are arranged in a fan-shaped pattern radiating from the integrally formed single root.

In some examples, the plurality of the eyelash clusters is spaced apart from one another at intervals ranging from 0.1 mm to 10 mm along the adhesive substrate.

The specific structure of the glue-free artificial eyelash product may refer to the foregoing embodiments. The glue-free artificial eyelash product adopts all the technical solutions of the foregoing embodiments, so it at least has all the technical effects brought by the technical solutions of the foregoing embodiments, which is not detailed herein.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. An artificial eyelash product, comprising:
   an auxiliary film configured for attachment to an eyelid of a user; and
   an eyelash cluster sheet affixed to the auxiliary film, wherein the eyelash cluster sheet comprises a plurality of eyelash clusters, each capable of being attached to the eyelid of the user,
   wherein an eyelash cluster of the plurality of eyelash clusters comprises:
   a curved tip part comprises a plurality of eyelashes; and
   an end part fixed to the auxiliary film,
   wherein the end part comprises an integrally formed single root from which the plurality of eyelashes radially or directionally extend.

2. The artificial eyelash product according to claim 1, wherein a shape of the auxiliary film comprises a strip, a block, a flake, or a cluster.

3. The artificial eyelash product according to claim 1, wherein the auxiliary film is made of polyester material.

4. The artificial eyelash product according to claim 1, wherein the plurality of eyelashes radially or directionally spread out from the single root on the end part of the eyelash cluster, wherein the plurality of eyelashes comprises a at least a first eyelash having a first length, a second eyelash having a second length, and a third eyelash having a third length.

5. The artificial eyelash product according to claim 1, wherein the auxiliary film is translucent or transparent.

6. The artificial eyelash product according to claim 1, wherein the plurality of eyelashes in the curved tip part are arranged in a fan-shaped pattern radiating from the single root.

7. The artificial eyelash product according to claim 1, wherein the plurality of the eyelash clusters is spaced apart from one another at intervals ranging from 0.1 mm to 10 mm along the auxiliary film.

8. The artificial eyelash product according to claim 1, wherein the auxiliary film is divisible into portions each carrying one or more eyelash clusters, the portions being shaped to conform to at least a part of an eyelid and to support attachment of the eyelash clusters thereto.

* * * * *